Oct. 25, 1960  H. H. NORQUIST ET AL  2,957,668
MATERIALS HANDLING PALLET AND METHOD OF MAKING PALLETS
Filed April 19, 1957  2 Sheets-Sheet 1

INVENTORS
Harry H. Norquist
BY Harry A. Gilbert

Attorney.

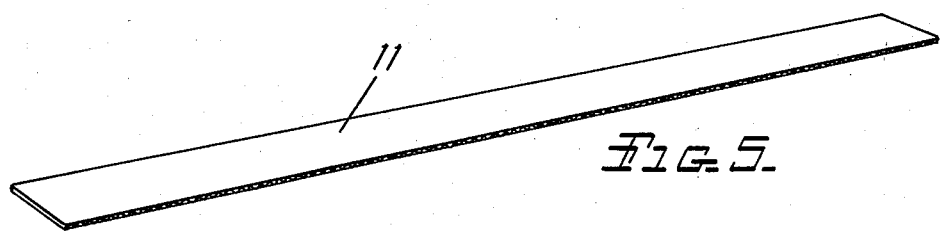
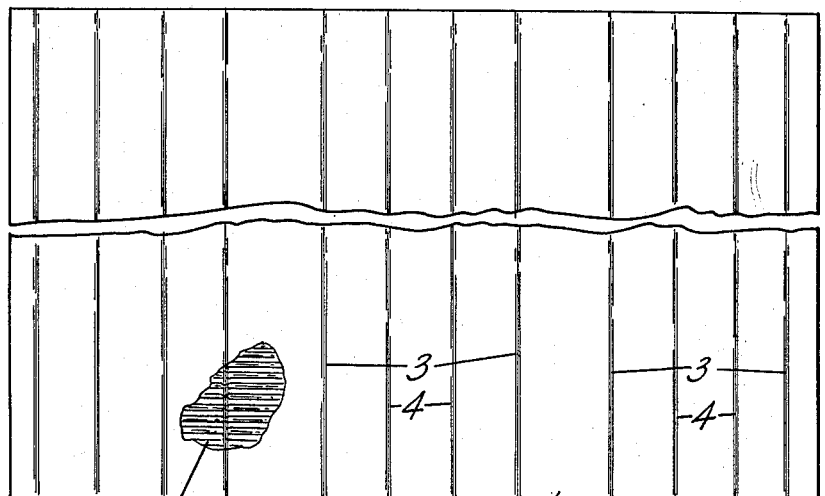
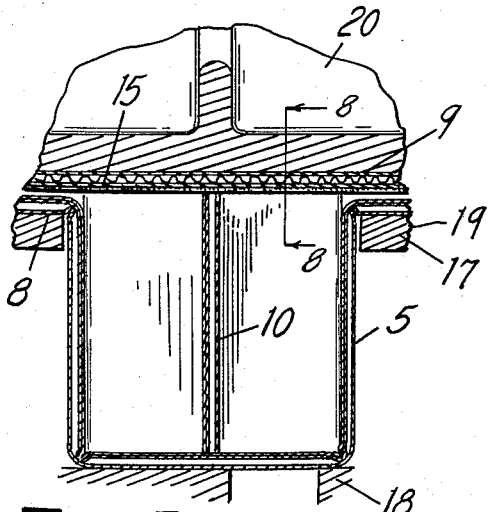
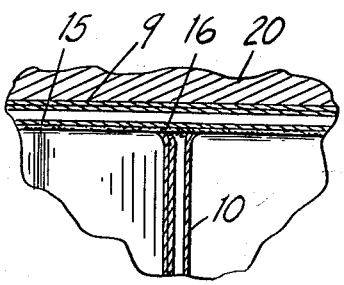
INVENTORS
Harry H. Norquist
BY Harry A. Gilbert
Attorney

United States Patent Office 2,957,668
Patented Oct. 25, 1960

2,957,668

MATERIALS HANDLING PALLET AND METHOD OF MAKING PALLETS

Harry H. Norquist and Harry A. Gilbert, Kalamazoo, Mich., assignors to Martinson Machine Company, Kalamazoo, Mich.

Filed Apr. 19, 1957, Ser. No. 654,021

3 Claims. (Cl. 248—120)

This invention relates to materials handling pallets of the type designed to be handled by forked lifting trucks when loaded.

The main objects of this invention are:

First, to provide a materials handling pallet which may be very economically formed of paperboard, desirably corrugated paperboard, and is strong and rigid and capable of withstanding heavy loads.

Second, to provide a materials handling pallet having these advantages which may be very economically produced so that it may be destroyed or disposed of when unloaded, as at the end of a shipment, the parts all being combustible or may be reduced to pulp for use in paper making if desired.

Third, to provide a method of producing material handling pallets having these advantages which may be practiced with the aid of quite simple apparatus and one in which the parts may be formed at one point or location and readily set up or assembled at another.

Objects relating to details and economies of the invention will appear from the description to follow. The invention is defined and pointed out in the claims.

A preferred embodiment of the invention is illustrated in the accompanying drawing, in which:

Fig. 5 is a perspective view of the leg brace member stock prior to zig-zag folding or forming thereof.

Fig. 6 is a fragmentary plan view of the sheet from which the base member is formed scored for folding.

Fig. 7 is an enlarged fragmentary view partially in vertical section illustrating an apparatus for use in the assembling of the parts and one of the steps in assembling.

Fig. 8 is a fragmentary view in section on a line 8—8 of Fig. 7.

The embodiment of my invention illustrated comprises a base member designated generally by the numeral 1 and formed of a single sheet of corrugated paperboard 2 which has spaced groups of scores 3—3 and 4—4 providing predetermined fold lines along which the sheet may be folded to provide upwardly facing channel shaped legs 5 of rectangular section. The sheet 2 is desirably folded transversely of the corrugations which are indicated at 6, Fig. 6.

Figure 1:
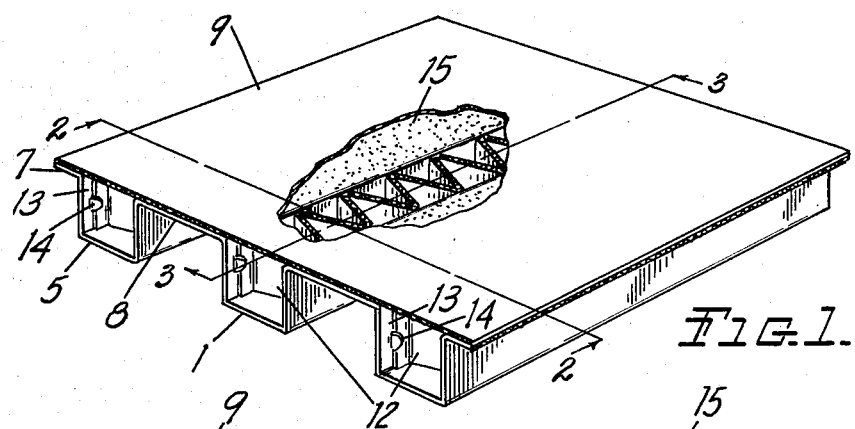
Fig. 1 is a perspective view of a material handling pallet embodying the invention, a portion of the deck member being broken away to show the relation thereof to other parts.
Figure 2:
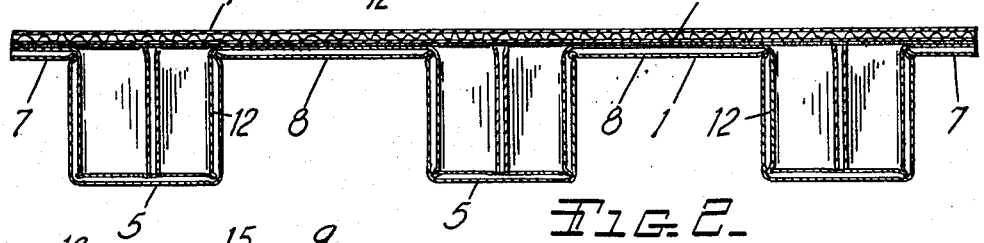
Fig. 2 is a sectional view transversely of the legs on a line corresponding to line 2—2 of Fig. 1.

Folding along the score lines results in legs 5, the outer walls of the outer legs having laterally projecting flanges 7. These flanges and the portions 8 of the base member constitute supports for the deck member 9 which is also desirably formed of corrugated paperboard, as is illustrated. The deck member 9 is a flat sheet dimensioned to the width and length of the base member, as is illustrated in Fig. 1.

Figure 3:
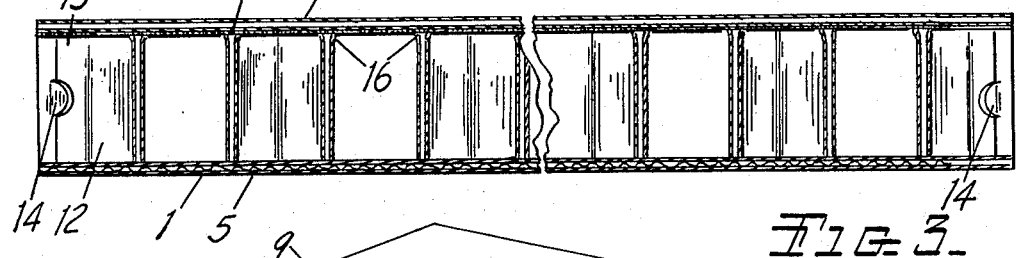
Fig. 3 is a fragmentary sectional view longitudinally through one of the legs taken on a line corresponding to line 3—3 of Fig. 1.
Figure 4:
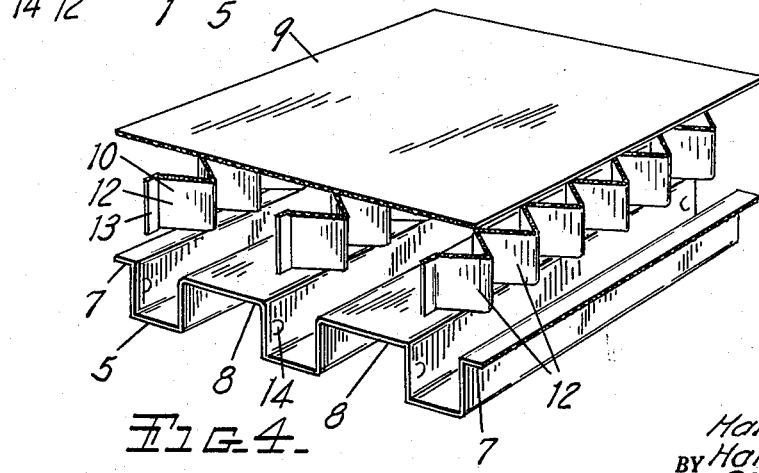
Fig. 4 is a perspective view of the parts of the pallet prior to the assembly thereof, a pallet provided with three legs and formed of five parts or elements.

The leg brace members 10 are formed of strips 11 of paperboard, preferably corrugated paperboard, the strips being zig-zag folded to provide a plurality of oppositely facing V-shaped strut members 12, the bights of which are in thrust supporting engagement with the side walls of the legs. The corrugations of these brace members extend vertically or, otherwise stated, the zig-zag folds are parallel to the corrugations of the strips. These brace members terminate in tongue-like projections 13 which in assembling the parts are engaged with the tongues 14 struck inwardly from one of the walls of each leg member adjacent the ends thereof and when assembled the ends of the brace members are retainingly engaged with these tongues as is clearly shown in Figs. 1 and 3.

The bottom edges of the leg members are in supported engagement with the bottom walls of the legs. The deck member 9 has an adhesive coating 15 on its underside, preferably extending throughout, and bonding the deck member to the horizontal portions of the base member and to the upper edges of the zig-zag folded leg braces. The leg braces are initially of a width exceeding the depth or height of the legs so that when the deck member is seated upon the horizontal portions of the base member the upper edges of the brace members are flared or upset at 16 and are bonded throughout to the deck member by the adhesive 15.

This upsetting of the upper edges of the braces insures an effective bond for each strut element of the braces to the desk member, supporting the bights thereof in thrust sustaining engagement with the side walls and the legs. This result being a very rigid structure capable of carrying heavy loads even when the parts are formed of relatively light stock, that is, as compared to the size of the pallet and the load it is designed to carry.

The steps or method of assembling are relatively simple and the necessary apparatus is also relatively simple. Certain of the method steps are illustrated in Figs. 7 and 8, an apparatus being conventionally illustrated in Fig. 7.

17 represents a press bed member adapted to support the prefolded base member with supports 18 for the bottoms of the legs and supports 19 for the intermediate or horizontal portions of the base member. The base member with the leg braces inserted therein is supported by press bed member 17 with upper edges of the braces projecting above the plane of the horizontal portions of the base member. The deck member 9 with adhesive 15 applied to the underside thereof, preferably throughout, is superimposed upon the base member and is initially supported in slightly elevated relation thereto by the braces, as shown in Fig. 7. The plunger or ram 20 of the press is then actuated and it forces the deck member with adhesive thereon upon the horizontal surfaces of the base member and upsets the brace members, as is indicated at 16 in Fig. 8.

This insures an effective bonding of the leg braces to the deck which holds the several strut elements thereof in effective supporting engagement with the walls of the legs. The ends of the legs being engaged with tongues 14, the leg struts cannot expand under this pressure. The tongues also hold the end portions 13 of the legs after the adhesive has set and the parts are bonded into a unit. The struts being securely bonded to the deck with their bights in thrust supporting engagement with the side walls of the legs do not shift or collapse under load.

The embodiment of the invention illustrated in detail is a highly desirable one and is very strong and rigid in proportion to the material parts entering into the structure. At the same time the material is economical and is ordinarily available. To illustrate, the corrugated paperboard preferably used, is such as is widely used in cartons and other shipping containers.

We have illustrated and described our invention in this preferred embodiment but we desire to point out that other fiberboard and paperboard materials may be used if desired. However, the arrangement of the corrugations of the sheet material as is illustrated and described, not only facilitates forming operations but results in maximum strength in the finished product.

Having thus described the invention, what is claimed as new and is desired to be secured by Letters Patent is:

1. A material handling pallet comprising an integral base member formed integrally of a sheet of corrugated paperboard folded transversely of the corrugations thereof to provide a plurality of laterally spaced upwardly facing parallel legs of rectangular channel section extending from edge to edge of the base member, the outer legs being spaced from the adjacent edges of the base member providing the outer arms of the legs with laterally projecting flanges of substantial width, a continuous deck member formed of a sheet of corrugated paperboard dimensioned to correspond to the dimensions of the base member with the legs formed therein super-imposed upon the base member with its corrugation disposed transversely of the corrugation of the base member, and leg braces formed of continuous strips of corrugated paperboard zig-zag folded parallel to the corrugations thereof providing a plurality of connected alternately facing V-shaped struts disposed vertically edgewise within the legs with the bights thereof in thrust supporting engagement with the sides of the legs and the bottom edges thereof in supported engagement with the bottoms of the legs, and the upper edges of the braces being compressedly expanded against the underside of the deck member, the meeting surfaces of said base member, deck member and legs being adhesively bonded.

2. A material handling pallet comprising an integral base member formed integrally of a sheet of corrugated paperboard folded to provide a plurality of laterally spaced upwardly facing parallel legs of rectangular channel section extending from edge to edge of the base member, the outer legs being spaced from the adjacent edges of the base member providing the outer arms of the legs with laterally projecting flanges of substantial width, a continuous deck member formed of a sheet of corrugated paperboard dimensioned to correspond to the dimensions of the base member with the legs formed therein superimposed upon the base member, and leg braces formed of continuous strips of corrugated paperboard zig-zag folded providing a plurality of connected alternately facing V-shaped struts disposed vertically edgewise within the legs with the bights thereof in thrust supporting engagement with the sides of the legs and the bottom edges thereof in supported engagement with the bottoms of the legs, and the upper edges of the braces being compressedly expanded against the underside of the deck member, the meeting areas of said base member, deck member and legs being adhesively bonded.

3. A material handling pallet comprising a base member formed integrally of sheet fiberboard folded to provide a plurality of laterally spaced upwardly facing channeled legs having parallel side walls, a deck member formed of sheet fiberboard superimposed upon the base member and extending over all of the legs thereof, and leg braces formed of continuous strips of paperboard zig-zag folded providing a plurality of connected alternately facing V-shaped struts disposed vertically edgewise within the legs with the bights thereof in thrust supporting engagement with the sides of the legs and the bottom edges thereof in supported engagement with the bottoms of the legs, the upper edges of the braces being upset against the underside of the deck member, the meeting surfaces of said base member, deck member and legs being adhesively bonded.

References Cited in the file of this patent

UNITED STATES PATENTS

| | | |
|---|---|---|
| 2,276,128 | Wellman | Mar. 10, 1942 |
| 2,446,914 | Fallert et al. | Aug. 10, 1948 |
| 2,489,054 | Sprolle | Nov. 22, 1949 |
| 2,528,413 | Budd | Oct. 31, 1950 |
| 2,696,356 | Baumann | Dec. 7, 1954 |
| 2,783,690 | Crary | Mar. 5, 1957 |
| 2,856,826 | Norquist | Oct. 21, 1958 |